(12) United States Patent
Suvakovic

(10) Patent No.: US 8,959,251 B2
(45) Date of Patent: Feb. 17, 2015

(54) IMPLEMENTATION OF SWITCHES IN A COMMUNICATION NETWORK

(75) Inventor: Dusan Suvakovic, Pleasanton, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 938 days.

(21) Appl. No.: 12/828,443

(22) Filed: Jul. 1, 2010

(65) Prior Publication Data

US 2011/0199936 A1    Aug. 18, 2011

Related U.S. Application Data

(60) Provisional application No. 61/304,548, filed on Feb. 15, 2010.

(51) Int. Cl.
*G06F 3/00* (2006.01)
*H04Q 11/00* (2006.01)
*H04J 3/04* (2006.01)

(52) U.S. Cl.
CPC ............... *H04Q 11/00* (2013.01); *H04J 3/047* (2013.01)
USPC ............................................................. 710/8

(58) Field of Classification Search
None
See application file for complete search history.

(56) References Cited

U.S. PATENT DOCUMENTS

| 5,497,118 A | * | 3/1996 | Ueno et al. | 327/416 |
| 6,208,163 B1 | * | 3/2001 | Wittig et al. | 326/39 |
| 6,909,710 B1 | | 6/2005 | Goldrian | |
| 7,139,291 B2 | * | 11/2006 | Arbel et al. | 370/537 |
| 8,131,150 B2 | * | 3/2012 | Feuer et al. | 398/83 |
| 2002/0167944 A1 | | 11/2002 | Hinchley | |
| 2008/0048790 A1 | * | 2/2008 | Bang et al. | 331/57 |

* cited by examiner

*Primary Examiner* — Idriss N Alrobaye
*Assistant Examiner* — Dayton Lewis-Taylor
(74) *Attorney, Agent, or Firm* — RGIP LLC

(57) ABSTRACT

A routing device such as either a 1:N demultiplexer or N:1 multiplexer can provide a power dissipation proportional to $\log_2(N)$ by augmenting a conventional data demultiplexer/multiplexer with additional control circuitry. The control circuit ensures that control signals that trigger configuration of individual demultiplexer/multiplexer elements are propagated only along a data transmission path. Logic components of the control circuitry enable the multiplexers to be self-configuring and to prevent multiplexers from switching to elements with empty data buffers.

18 Claims, 17 Drawing Sheets

IMPLEMENTATION OF SWITCHES IN A COMMUNICATION NETWORK

CROSS REFERENCE TO RELATED APPLICATIONS

The present application is related to and claims the benefit of U.S. Provisional Patent Application No. 61/304,548 filed Feb. 15, 2010.

FIELD OF THE INVENTION

This disclosure relates to switching elements and in particular to an architecture for implementation of switches in a communication network.

BACKGROUND OF THE INVENTION

A minimum energy optical network is considered to be one that provides point-to-point connection for every pair of end-users. In such a network, each user can transmit to only one other receiver at a time and only the optical transmitter (laser) that is currently transmitting is turned on at any given time. However, given the large number of separate optical channels to choose from, the user node must include a device capable of selecting the proper optical channel and routing the communication payload originating from the user premises equipment (such as a personal computer), to the selected optical transmitter. Similarly, the user node must include a device capable of buffering and delivering to the user, the payload received through each one of its optical channels.

These functions are implemented by certain electronic circuitry. Given that complementary metal-oxide-semiconductor (CMOS) is, and is expected to remain the most energy-efficient electronic technology in the foreseeable future, the best implementation of the transmitting router for the minimum energy optical network should be based on digital CMOS circuits. For the same reason, a receiver at every user node of the minimum energy optical network should also be a digital CMOS circuit.

However, the choice of the implementation technology is not a sufficient guarantee for high energy efficiency of a circuit. In fact, the design of the two devices described above is rather challenging assuming that a large number of optical fibers is originating from one user node. In a conventional implementation, the device on the transmit side would appear as a large 1-to-N digital demultiplexer, where N is the number of optical fibers. As shown in FIG. 2, a 1-to-N demultiplexer 20 would consist of approximately 2N digital 1-to-2 demultiplexers 10, whose logic function is illustrated in FIG. 1 using two two-input NAND gates 12, 14 and one inverter 16. It can be seen from FIG. 2 that each demultiplexer is controlled by one from the set of 'select' signals tsel_1 22, tsel_2, tsel . . . k, where k=log 2(N). As a result of this control scheme, each time a new route is selected between the user interface and one of the optical fibers, the 'select' signals will change, causing energy dissipation in the 1-to-2 demultiplexers. Assuming that, on the average, one half of the 'select' signals change its state and that there are ~2N demultiplexers, the total dissipation will be proportional to N.

The conventional implementation of the receive routing device is an N-to-1 multiplexer 40 shown in FIG. 4, which consists of about 2N 2-to-1 multiplexers 30, whose logic function is shown in FIG. 3. The logic function is depicted as consisting of 3 NAND gates 32, 34 36 and one inverter 38. Similar to the control in the conventional implementation of the transmit device, the multiplexers in FIG. 4 are controlled by a set of 'select' signals rsel_1 42, rsel_2, . . . rsel_k, where k=$\log_2$(N) and the resulting dissipation is proportional to N.

The prior art circuits of FIGS. 1 to 4 represent the logic functions for known demultiplexer and multiplexer systems. It will be apparent to a person skilled in the art, that these logic functions can be implemented by many alternative circuits to the ones depicted in these figures.

What is required is a routing device with lower energy dissipation than the conventional routing devices discussed above.

SUMMARY OF THE INVENTION

An object of the invention is to develop digital CMOS circuits suitable for implementation of 1-to-N and N-to-1 electronic switches and routing devices for very large values of N (e.g., N=100,000,000) that would consume energy proportional to $\log_2$(N) rather than proportional to N. This may be achieved by the use of multiplexer and demultiplexer circuits and architectures in accordance with the invention that enable propagation of the control signals along a payload transmission path.

This invention achieves the reduction of energy consumption in the electronic transmit and receive routing devices in nodes of the minimum energy network, by making their switching dissipation proportional to $\log_2$(N), rather than to N. The reduction is achieved by augmenting the basic demultiplexer and multiplexer circuits of FIGS. 1 and 3 respectively, to include control circuitry such as switch state memory and/or more complex control signaling. As such, the switch state changes have been limited only to the demultiplexers/multiplexers on the routing path for data transmission, while causing no dissipation in the remaining demultiplexers/multiplexers.

In one aspect of the disclosure, there is provided a method for configuring a CMOS routing device comprising a plurality of switching elements that can be configured to form a routing path through the routing device. The method comprises receiving a control signal into the routing device, propagating the control signal through the routing path, and configuring the switching elements on the routing path that receive the control signal.

In one aspect of the disclosure, there is provided a 1:N demultiplexer comprising a plurality of 1:2 demultiplexers comprising. The 1:2 demultiplexers may comprise control circuitry and a data demultiplexer. The control circuitry may be configured to, receive a configuration phase signal that places the 1:2 demultiplexer in a configuration phase and during the configuration phase, select one of a first routing path and a second routing path, configure the selected one of the first routing path and the second routing path as an output routing path, and output the configuration phase signal only on the output routing path. The data demultiplexer may be configured to, during a data transmission phase, receive an input data signal and output the input data signal onto the output routing path configured during the configuration phase.

In one aspect of the disclosure, there is provided a an N:1 multiplexer comprising a plurality of 2:1 multiplexers. The 2:1 multiplexers may comprise a first input path, a second input path, an output path, a data multiplexer and control circuitry. The data multiplexer may be configured to receive an input data signal on a selected one of the first input path or the second input path and output the input data signal on the output path. The control circuitry may be configured to receive at least one control signal, propagate the at least one control signal on the output path, and switch the configuration of the data multiplexer in response to the at least one control signal.

BRIEF DESCRIPTION OF THE DRAWINGS

Reference will now be made, by way of example only, to specific embodiments and to the accompanying drawings in which.

DETAILED DESCRIPTION OF THE INVENTION

As described above, it is an object to provide a routing device with lower energy dissipation.

Figure 17:
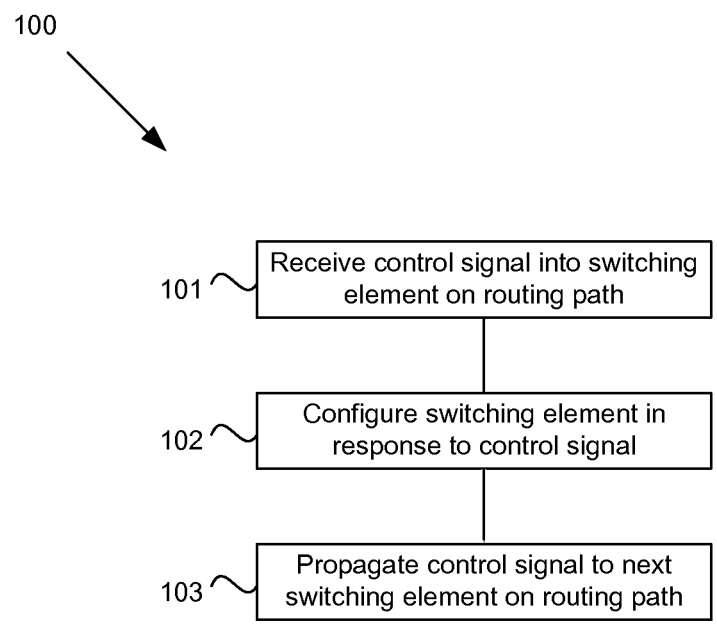
FIG. 17 shows a flowchart of a method for configuring a routing device.

Also as described above, conventional routing devices based on CMOS electronic switches generally produce energy dissipation proportional to N. By providing additional control signals to the switching elements of the routing device, the energy dissipation can be limited to those switching elements on the routing path, thus lowering the energy dissipation to an amount proportional to $\log_2(N)$. A method for configuring a CMOS routing device in accordance with an embodiment of the invention is illustrated in the flowchart 100 of FIG. 17. At step 101, a control signal is received into a switching element on the routing path of the routing device. At step 102, the switching element is configured in response to the control signal. At step 103, the control signal is propagated to a next switching element on the routing path. The routing device may be a sending or receiving device. A receiving device may be based on an augmented multiplexer unit while a sending device may be based on an augmented demultiplexer device. These devices will be described individually below.

Augmented Demultiplexer

Figure 1:
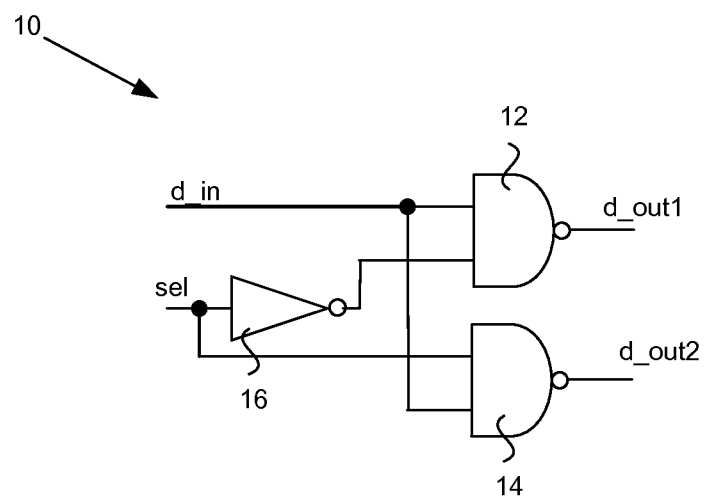
FIG. 1 shows a conventional 1:2 demultiplexer.
Figure 2:
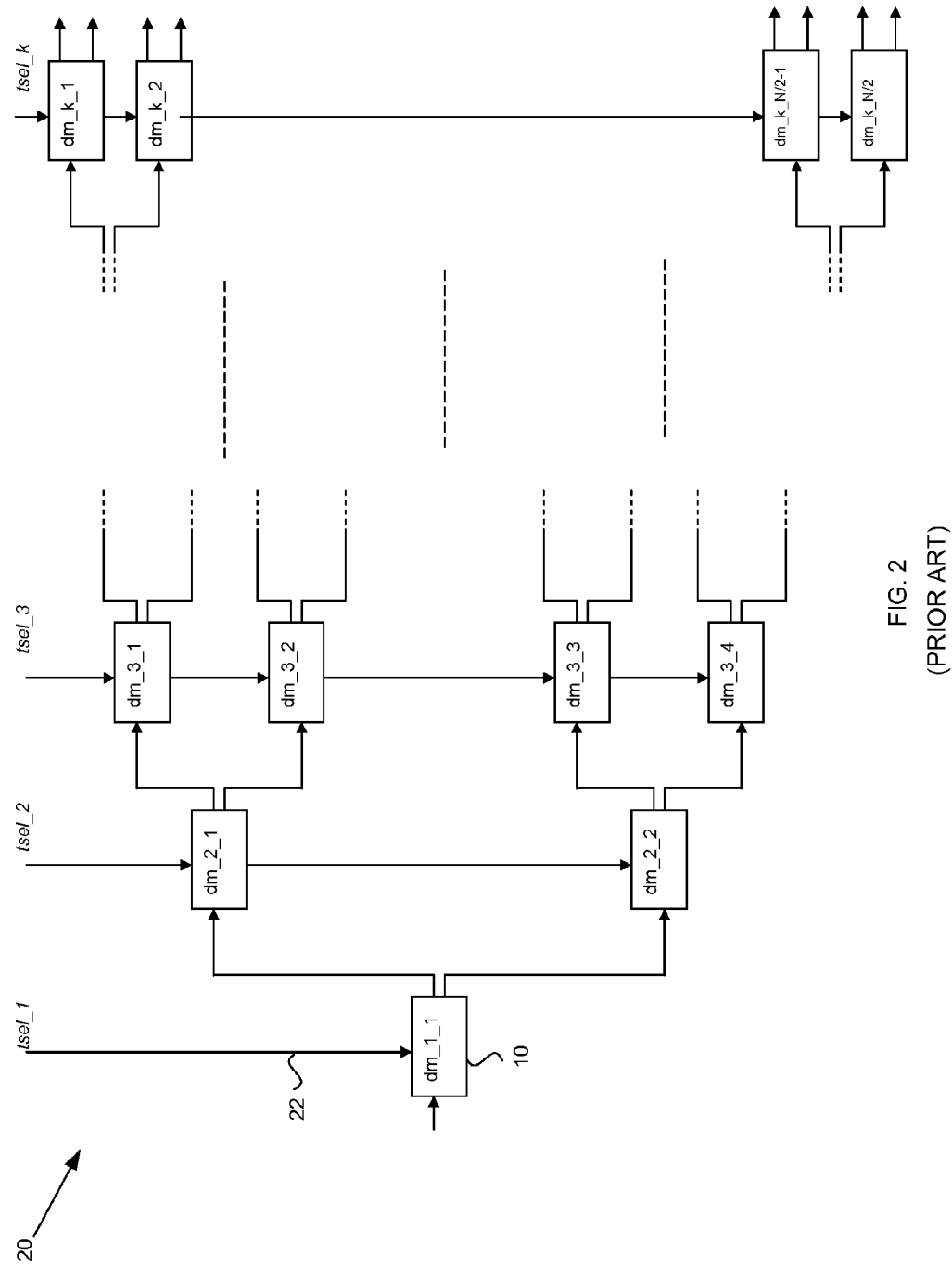
FIG. 2 shows a conventional 1:N demultiplexer based on the 1:2 demultiplexer of FIG. 1.
Figure 5:
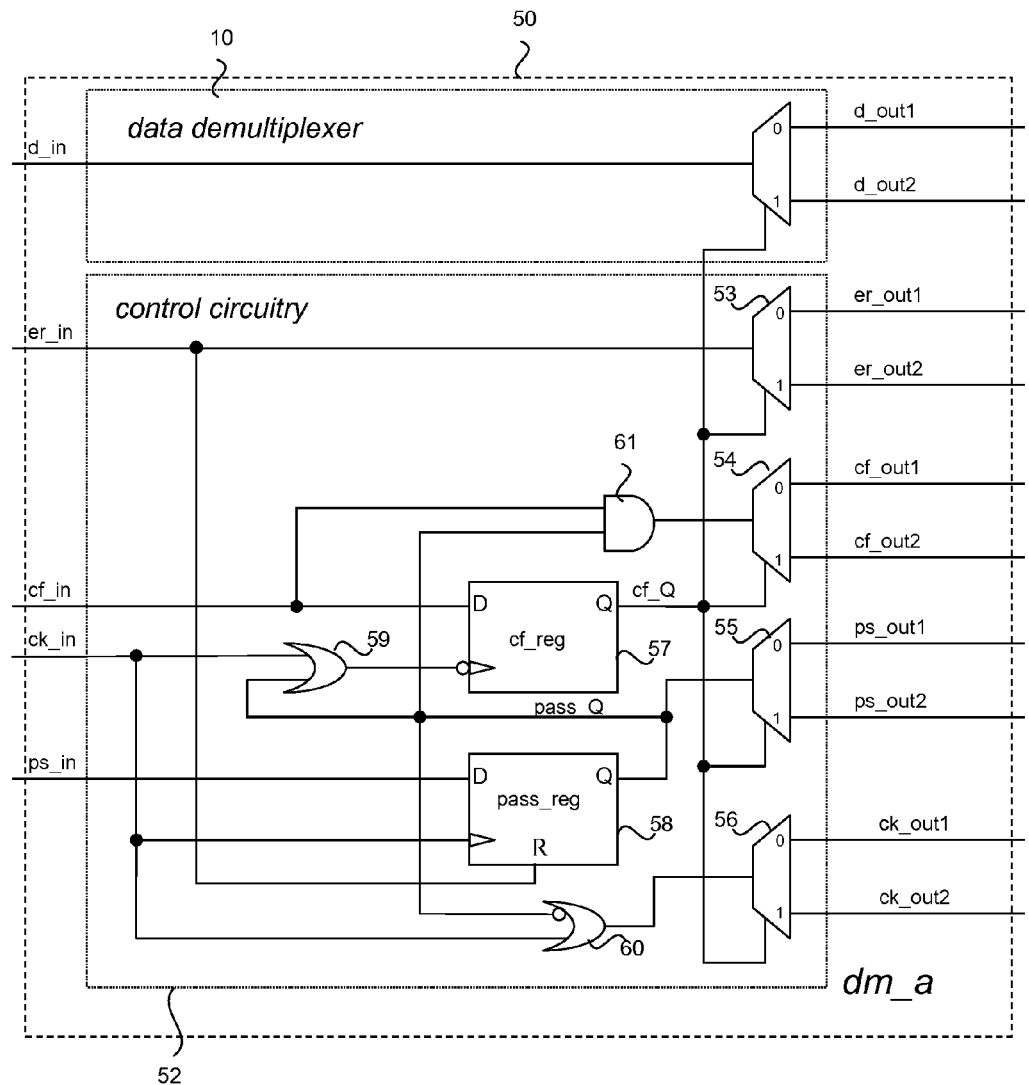
FIG. 5 shows a 1:2 demultiplexer in accordance with an embodiment of the instant application.

The augmented demultiplexer 50 in accordance with this disclosure is illustrated in FIG. 5. In addition to the data demultiplexer 10 circuit of FIG. 1 consisting of two NAND gates and an inverter, the augmented demultiplexer (dm_a) further includes the control circuitry 52 consisting of four control signal demultiplexers 53, 54, 55, 56, two edge-triggered flip-flops 57, 58 and three simple logic gates. The control signal multiplexers include a configuration phase signal demultiplexer 55 configured to propagate a configuration phase signal, a switch configuration demultiplexer 54 configured to propagate a switch selection signal, a clock signal demultiplexer 56 configured to propagate a clock signal, and a register reset demultiplexer 53 configured to propagate a register reset signal.

The purpose of the control circuitry is to configure the path for the communication data payload in such a way as to confine the energy consumption due to re-configuration only to the $\log_2(N)$ cascaded instances of dm_a that are part of the newly established data routing path. An example of such path is illustrated by the dashed line in the 1:N demultiplexer 60 of FIG. 6 which is based on a cascaded augmented 1:2 demultiplexers 50. By passing the control signals only along the data transmission path, the number of switches requiring configuration can be reduced, thereby reducing power dissipation in the 1:N demultiplexer.

The two state bits stored by each dm_a are the switch configuration stored in the register (flip-flop) named cf_reg 57 and the pass state stored in the register (flip-flop) named pass_reg 58. The pass register pass_reg 58 receives a control signal ps_in that places the demultiplexer in a switch configuration phase during which the switch configuration register cf_reg may be updated.

During the data transmission phase, the states of cf_reg 57 and pass_reg 58 remain constant. Signal cf_Q, which is the output of the switch configuration register cf_reg 57, controls all the 1-to-2 demultiplexers in dm_a 10, 53, 54, 55, 56, 57, by selecting one of the two outputs to which all data and control signals are to be forwarded. The selection is based on a selection signal cf_in that is received into the cf_reg 57. For all instances of dm_a except the first one (the one at the entry point of 1-to-N demultiplexer), cf_in is the cf output (cf_out1 or cf_out2) of the preceding dm_a stage. For the very first instance of dm_a, cf_in is driven by a sequence of the destination address bits taken, for example, from the packet header.

Figure 6:
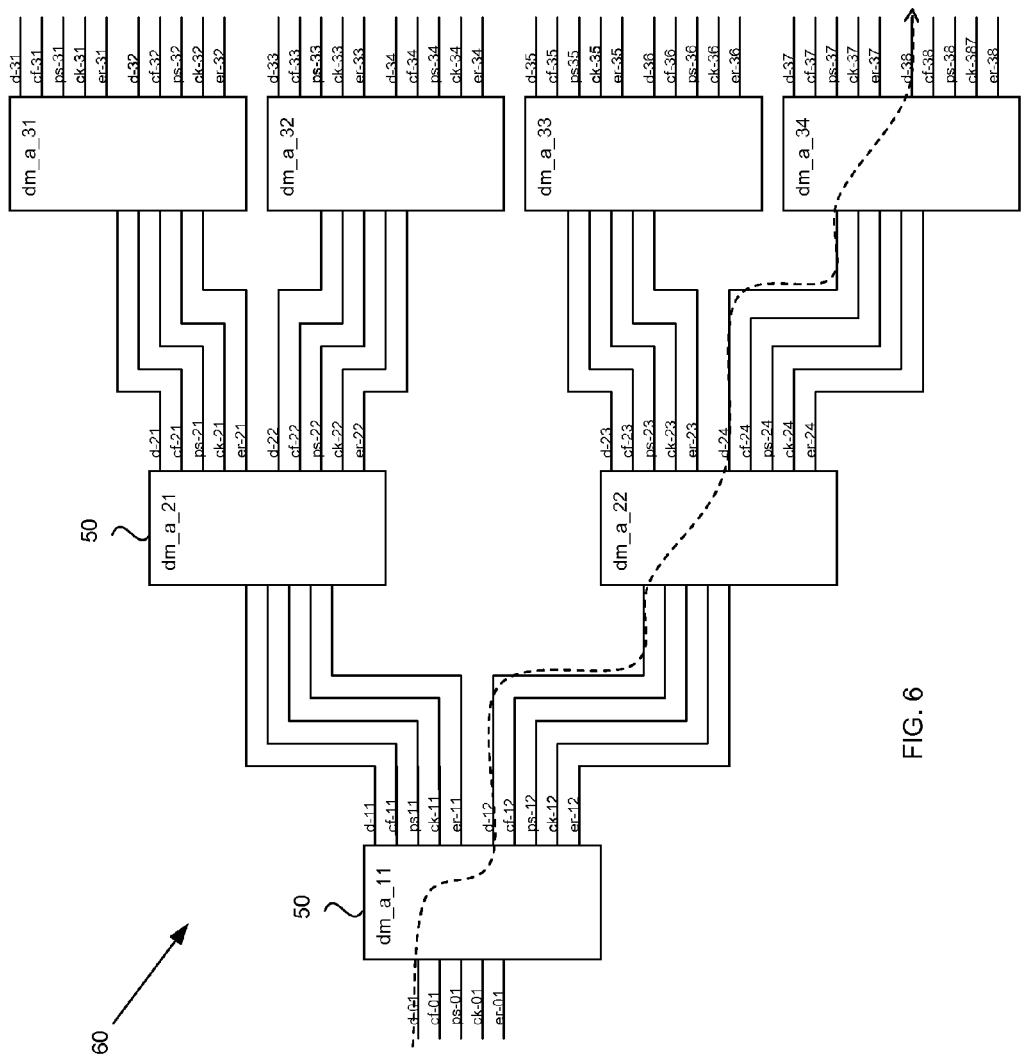
FIG. 6 shows a 1:8 demultiplexer based on the 1:2 demultiplexer of FIG. 5 in accordance with an embodiment of the instant application.

As shown in FIG. 5, both registers 57, 58 are driven by the configuration input clock signal ck_in. The source of this clock signal is external to the 1-to-N switch and is part of the user equipment. ck_in is active during the switch configuration phase, but not during the payload transmission phase. Each dm_a 50 forwards this signal to one of its two successor dm_a modules, as shown in FIG. 6. Therefore, this clock signal is not broadcasted to all demultiplexers, but instead propagated to a sequence of demultiplexers lying in the data routing path of the following transmission phase. Since the number of demultiplexers in one such path is $\log_2(N)$, the dissipation associated with the activity of ck_in is proportional to $\log_2(N)$. The direction of propagation of signal ck_in is controlled by signal cf_Q. More specifically, the direction of propagation of signal ck_in is controlled by the updated state of cf_reg, establishing the pending routing path for data transmission. To ensure that signal ck_in is not propagated in another direction before the cf_reg is updated, the input of the demultiplexer 56 driving signals ck_out1 and ck_out2 is gated (i.e. forced to logic 'one') by signal pass_Q, which is the output of pass_reg. The state of pass_reg determines when the input control signals can be passed to the dm_a output. Since dm_a pass output signals ps_out1 and ps_out2 are driven by the registered signal pass_Q, the propagation of the "pass" control through the routing path is sequential and takes $\log_2(N)$ ck_in clock cycles. As a result, the number of ck_in clock periods seen by each subsequent dm_a is one less than that seen by its predecessor dm_a.

Figure 7:
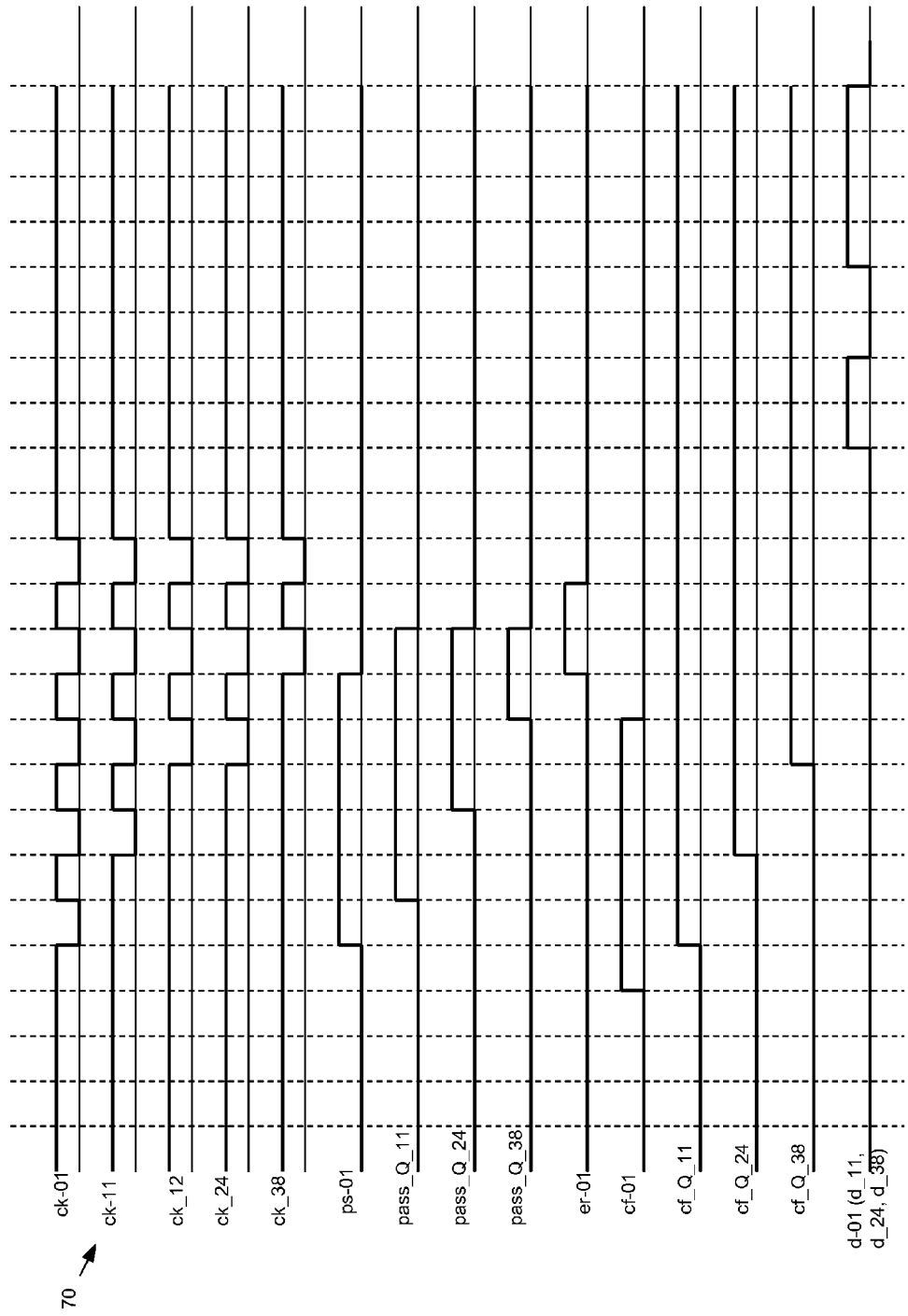
FIG. 7 shows a timing chart for the 1:2 demultiplexer in accordance with an embodiment of the instant application.

Signal pass_Q switches from low to high (i.e. from the "block" to the "pass" state one half cycle of ck_in after the state of cf_reg is updated). This is achieved by cf_reg being triggered by the falling edge of ck_in, pass_reg being triggered by the rising edge of ck_in and by the ck_in waveform starting from the idle 'one' state, as shown in FIG. 5 and the timing chart 70 of FIG. 7.

Additionally, the clock_input of register cf_reg is gated by pass_Q to preserve its state established immediately before pass_reg enters its "pass" state. Also, the pass_reg registers in all dm_a modules along the routing path are all reset to zero at the end of every configuration phase, by the control input er_in. The latter signal is also propagated along the routing path. The waveform and timing of er_in with respect to the related pass_Q signals is also shown in the timing chart 70 of FIG. 7.

Propagation of the pass_Q signal to the next dm_a through one of the outputs ps_out1 and ps_out2 is controlled by the configuration state signal cf_Q. Since the update of conf_reg 57 precedes the update of pass_reg 58 and since pass_reg 58 is reset to zero prior to the update of cf_reg, the possibility of propagation of unintended "glitches" in the "pass" signaling is eliminated.

The propagation of signal cf_in, being gated by signal pass_Q and steered by signal cf_Q, is identical to that of signal ck_in and requires no further explanation.

The propagation of signal d_in is steered by signal cf_Q and propagated to all dm_a modules on the routing path instantly. As shown in the timing chart 70 of FIG. 7, this occurs after the configuration of the 1-to-N switch of FIG. 6 is completed and does not require propagation of a clock signal through the switch. Signals d_in, d_out1 and d_out2 of FIG. 5 are shown as single wires (i.e. 1-bit data buses), but it should be clear that any other data bus width is equally beneficial in terms of the multiplexer functionality and can be used for implementation of demux_aug and the N-to-1 switch. In fact, the choice of a multiple bit or multiple byte data bus is contemplated as it would increase the throughput of the 1-to-N switch.

Augmented Multiplexer

Figure 3:
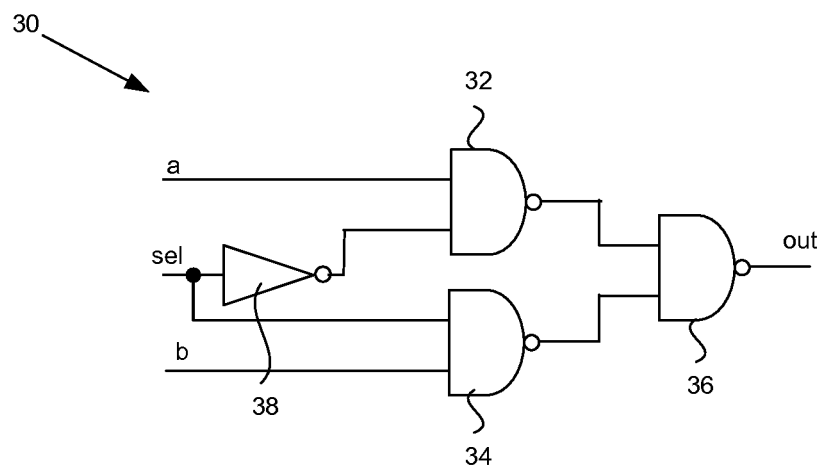
FIG. 3 shows a conventional 2:1 multiplexer.
Figure 4:
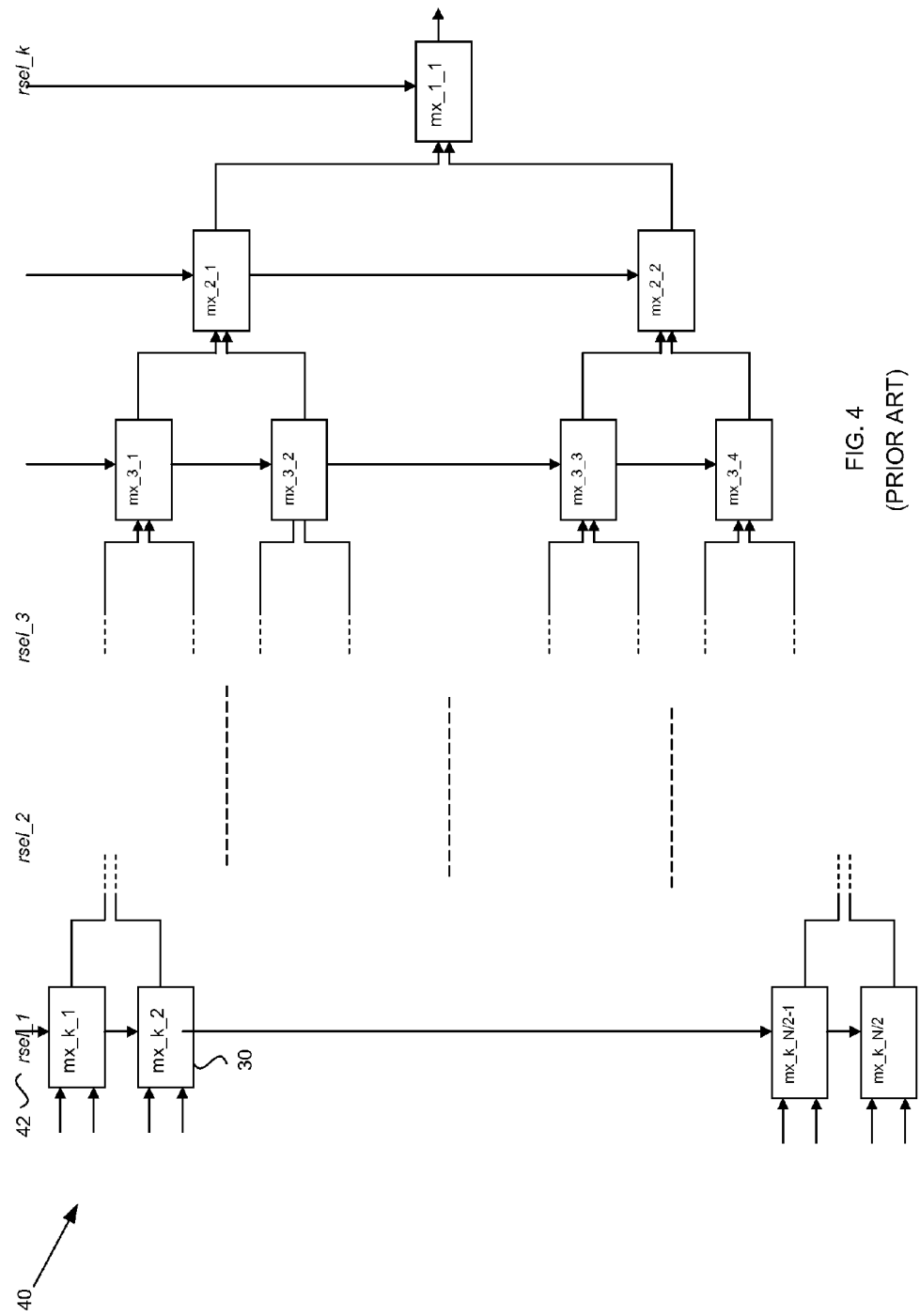
FIG. 4 shows a conventional N:1 multiplexer based on the 2:1 multiplexer of FIG. 3.
Figure 8:
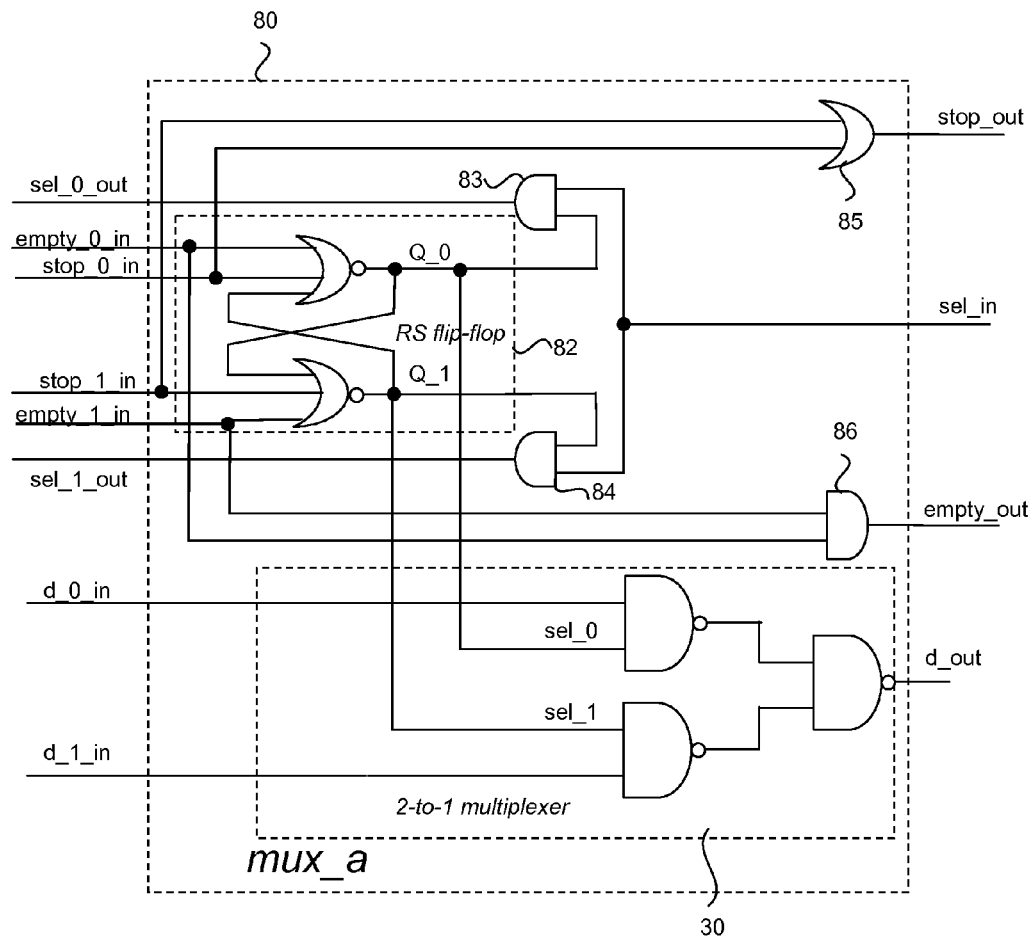
FIG. 8 shows a 2:1 multiplexer in accordance with an embodiment of the instant application.

A schematic of the augmented 2-to-1 multiplexer mx_a is shown in FIG. 8. It may include a conventional 2-to-1 multiplexer 30 (e.g. of the type shown in FIG. 3), a RS (reset-set) flip-flop 82 and 4 additional logic gates 83, 84, 85, 86 responsible for forwarding control signals. The state of the RS flip-flop 82 depends on its previous state as well as the inputs stop_0_in, stop_1_in, empty_0_in and empty_1_in. The truth table listing possible states of the flip-flop as function of its inputs is shown below:

| stop_0_in  | 1 | x | 0 | 0 | x | 1 | x | 1 | 0 |
|---|---|---|---|---|---|---|---|---|---|
| empty_0_in | x | 1 | 0 | 1 | x | 1 | x | x | 0 |
| stop_1_in  | 0 | 0 | 1 | x | x | x | 1 | 1 | 0 |
| empty_1_in | 0 | 0 | x | 1 | 1 | 1 | x | x | 0 |
| Q_0        | 0 | 0 | 1 | 1 | 0 | 0 | 0 | 0 | previous state |
| Q_1        | 1 | 1 | 0 | 0 | 0 | 0 | 0 | 0 | previous state |

Figure 9:
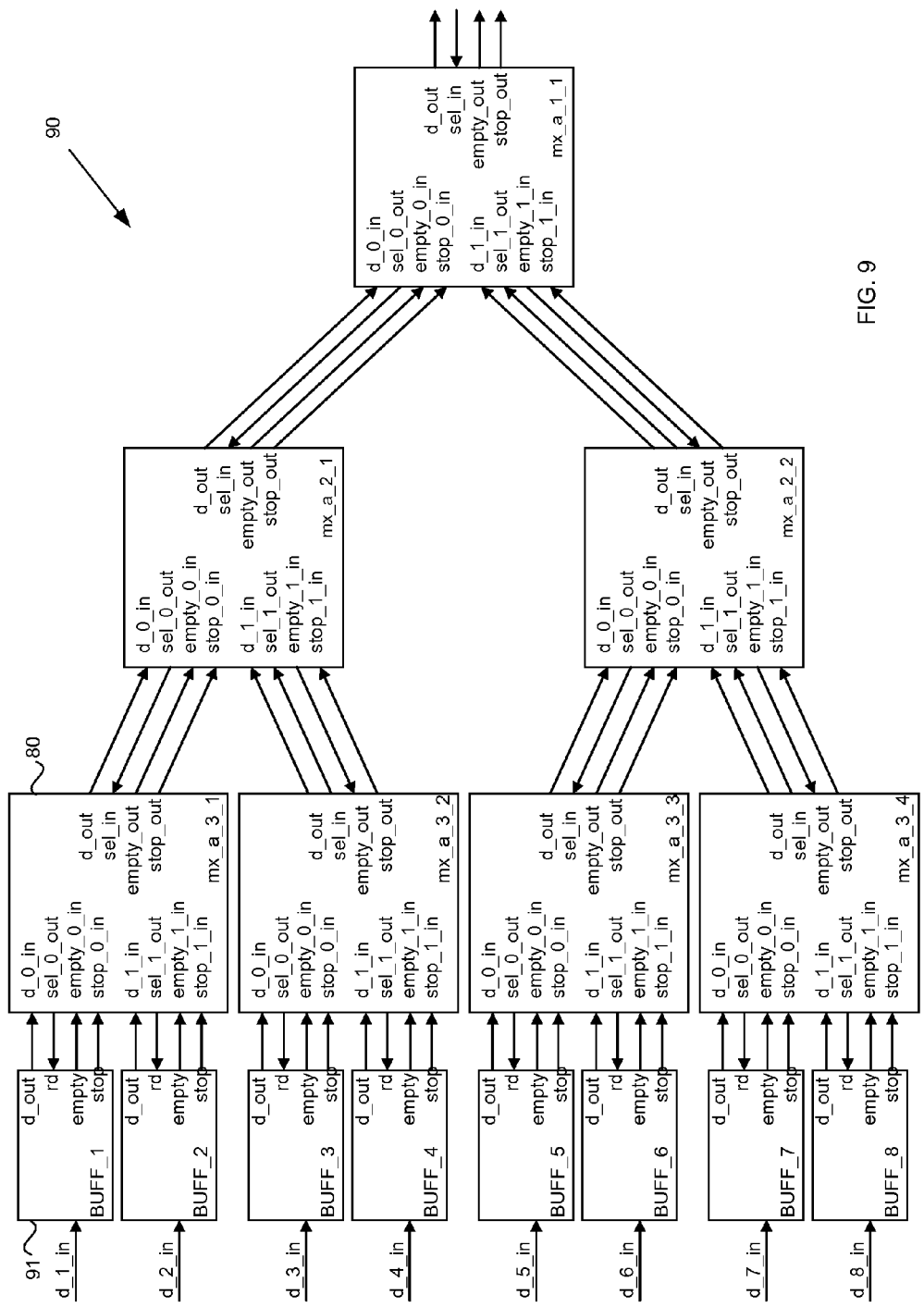
FIG. 9 shows a 8:1 multiplexer based on the 2:1 multiplexer of FIG. 8 in accordance with an embodiment of the instant application.

2N−1 mx_a multiplexers 80 can be cascaded, as shown in FIG. 9 to form a N-to-1 multiplexer 90. As also shown in FIG. 9, the inputs of the 8-to-1 multiplexer (leftmost column of mx_a) are driven by outputs of data buffers 91 receiving user communication payload. In each instance of mx_a, the state of the flip-flop 82 controls the multiplexer 80, passing either the input d_0_in or d_1_in to the output d_out.

Figure 10:
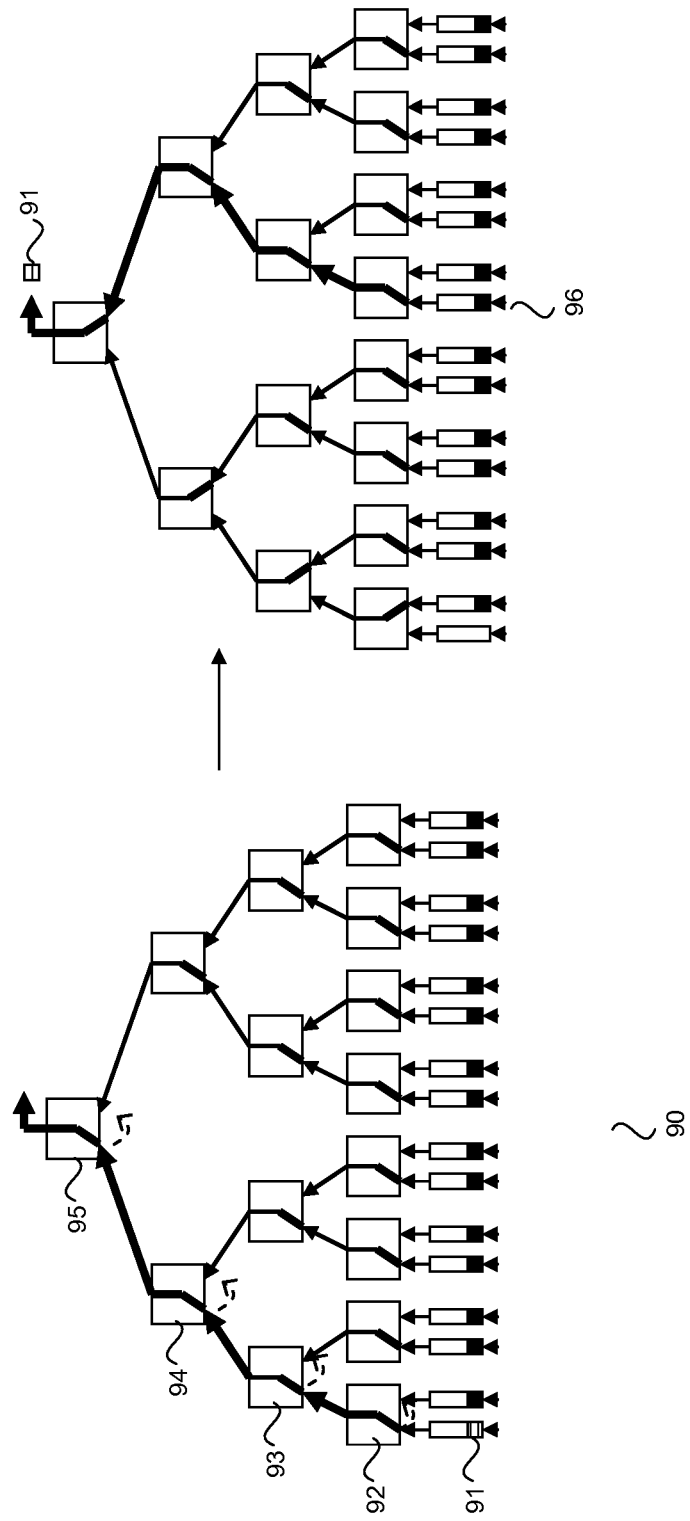
FIG. 10 shows a state transition of a multiplexer in accordance with an embodiment of the instant application.

The N-to-1 multiplexer 90 specified by FIGS. 8 and 9 and the above truth table is self-configurable in that it adjusts the states of its flip-flops such as enable data transmission between one of the non-empty buffers and the output node. Additionally, the sequence of its configuration is "fair", such that, after reading from one of the buffers (for example, BUFF_1 91), it visits all other non-empty buffers before revisiting BUFF_1. Moreover, the energy consumed due to each reconfiguration of the multiplexer is proportional to $\log_2(N)$ because each reconfiguration affects only the $\log_2(N)$ 2-to-1 multiplexers which were forming the data transmission path immediately prior to reconfiguration. An example of this behavior is illustrated in FIG. 10. Switches in this figure represent flip-flop controlled multiplexers. At the initial state shown on the left hand side of FIG. 10, the routing path connects buffer 91 to the output of the multiplexer 90. Once buffer 91 has been transmitted to the output, as shown in the state of the multiplexer 90 on the right hand side of FIG. 10, the configuration of each multiplexer mx_a on the data transmission path is switched. That is, each of mx_a 92, mx_a 93, mx_a 94 and mx_a 95 is configured to select the previously non-selected input path. Post configuration, buffer 96 is the buffer that is connected to the output.

Signals empty_0_in, empty_1_in, stop_0_in and stop_1_in control the flip flop 82. Input stop_x_in of some instance of mx_a_p_q is set to '1' at the end of payload transmission from one of the buffers. The 'stop' signal is driven by this buffer and propagated to all mx_a units along the transmission path. Signal stop_x_in is a short pulse, which is generated by the buffer currently being read, according to the way the buffer has been configured. For example, the buffer can be configured to issue the 'stop' pulse when its last payload bit (or word) is being read out, or when the last bit (or word) of a packet is being read out from it etc. (One skilled in the art may recognize a number of other beneficial ways to specify when the buffer should issue the 'stop' pulse.)

When set to '1', input stop_0_in forces the state of the flip-flop output Q_0 to switch from '1' to '0', disabling traffic flow from multiplexer's input d_0_in. If, at that time, the state of signal empty_1_in is '0', the state of flip-flip output Q_1 will switch from '0' to '1', thus configuring the multiplexer to pass traffic from its input d_1_in. However, if the state of empty_1_in is '1' at that time, the multiplexer will be disabled and both outputs sel_0_out and sel_1_out set to '0'. In this manner, the multiplexer avoids reading from empty buffers or spending time attempting to read from empty buffers. This mechanism is illustrated in FIGS. 11-16.

Figure 11:
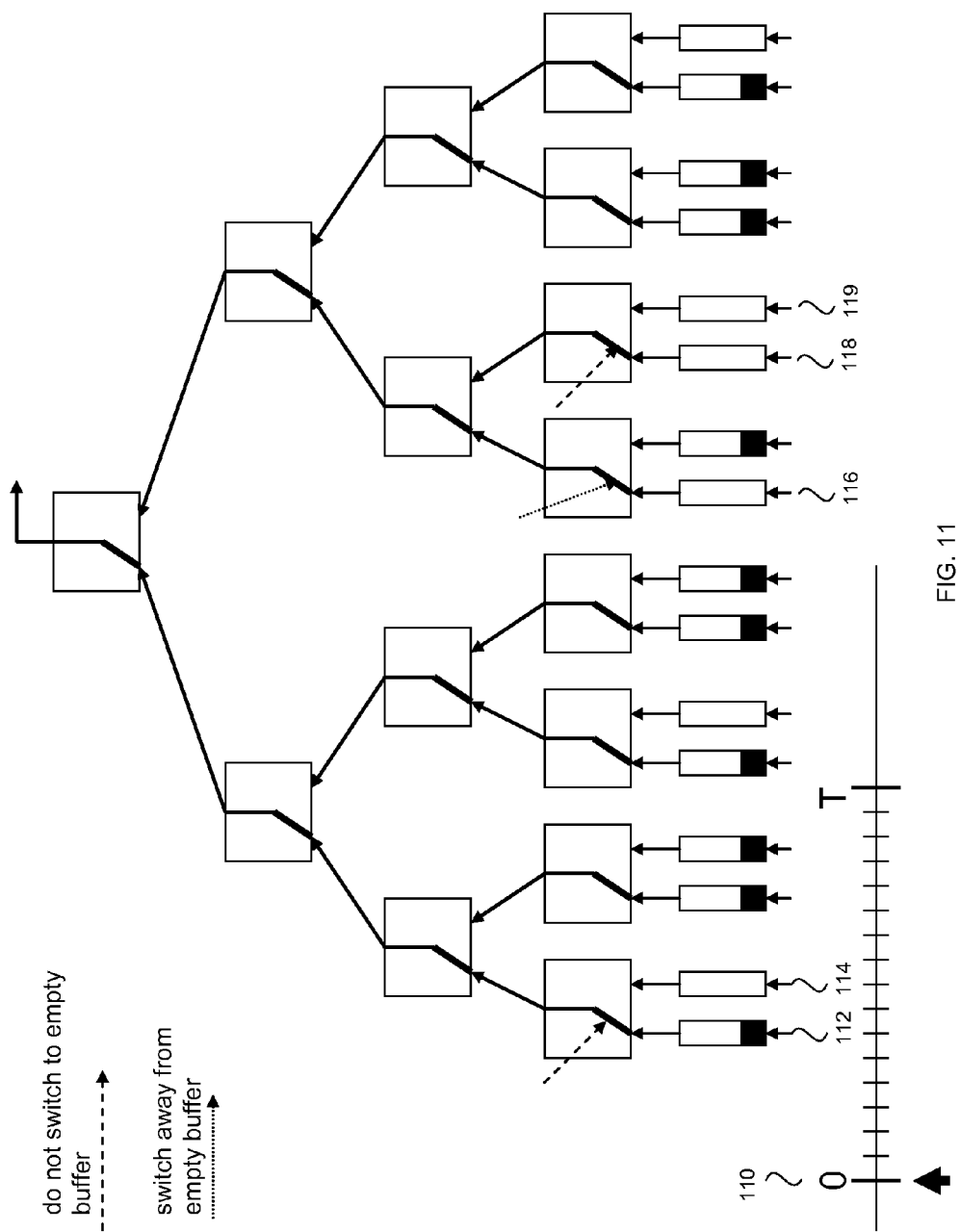
FIGS. 11 to 16 show successive iterations of a multiplexer in accordance with an embodiment of the instant application.
Figure 12:
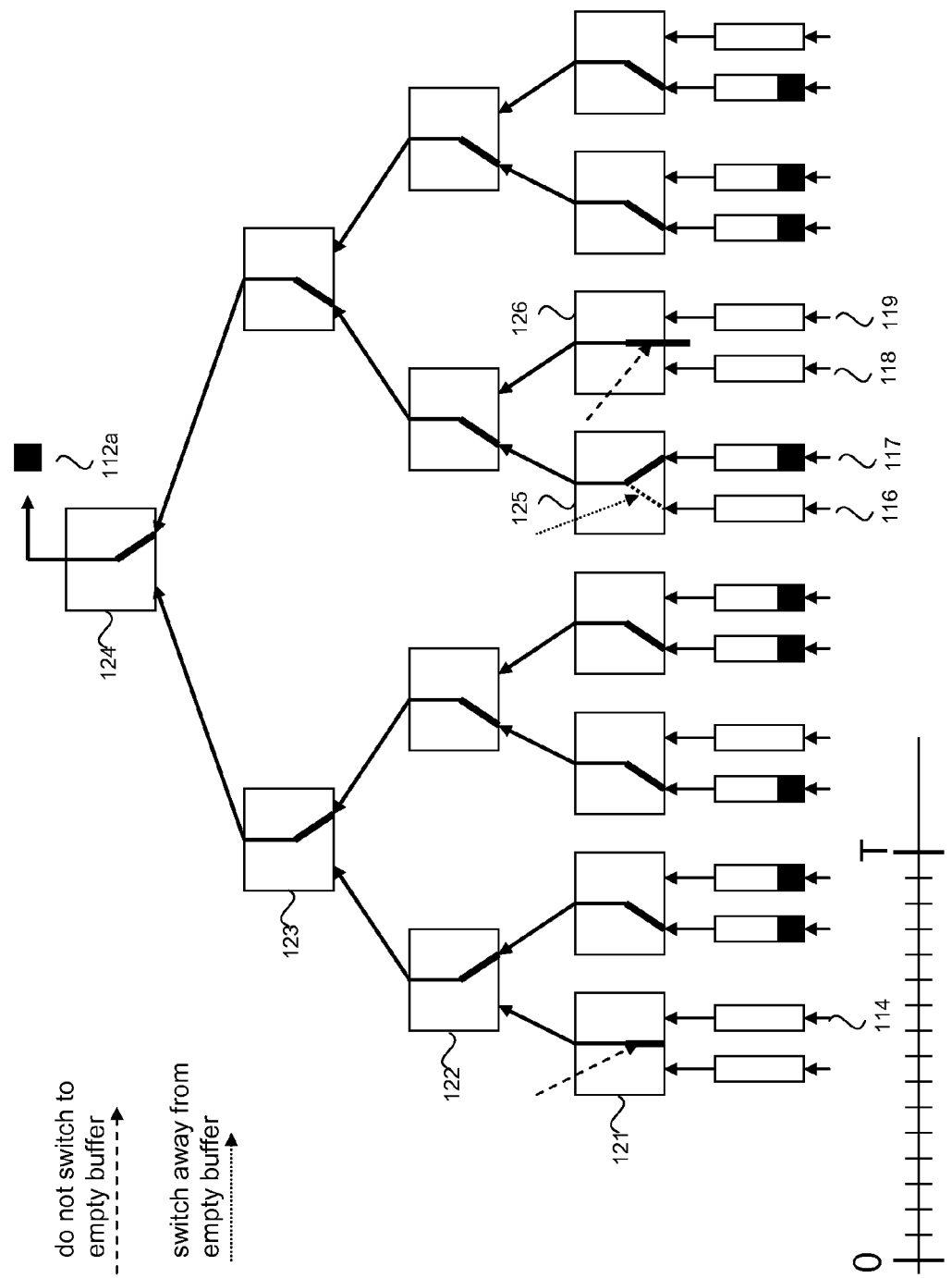

Referring first to FIG. 11, at an initial time indicated on time scale 110, the multiplexer is configured to pass the content of buffer 112 to the output and then reconfigure. It is noted in this state, buffers 114, 116, 118 and 119 are empty. The state passes to the state shown in FIG. 12 in which the buffer 112 has been transmitted to the output (indicated by 112a). The stop signal propagated along the switching elements 121, 122, 123, 124 of the data transmission path provides the control signal that triggers the reconfiguration of these switching elements 121, 122, 123, 124. Since buffer 114 is empty, the element 121 de-selects the original buffer 112 but does not select the empty buffer 114. In addition, the empty_in inputs provided by buffers 116 and 118 cause their respective switching elements 125, 126 to configure. In the case of the element 125, buffer 117 is not empty, and so is selected. The path from buffer 117 provides the next data transmission path for the multiplexer. In the case of switching element 126, both input buffers are empty so the flip-flop passes neither of these buffers to the output of the switching element 126.

Figure 13:
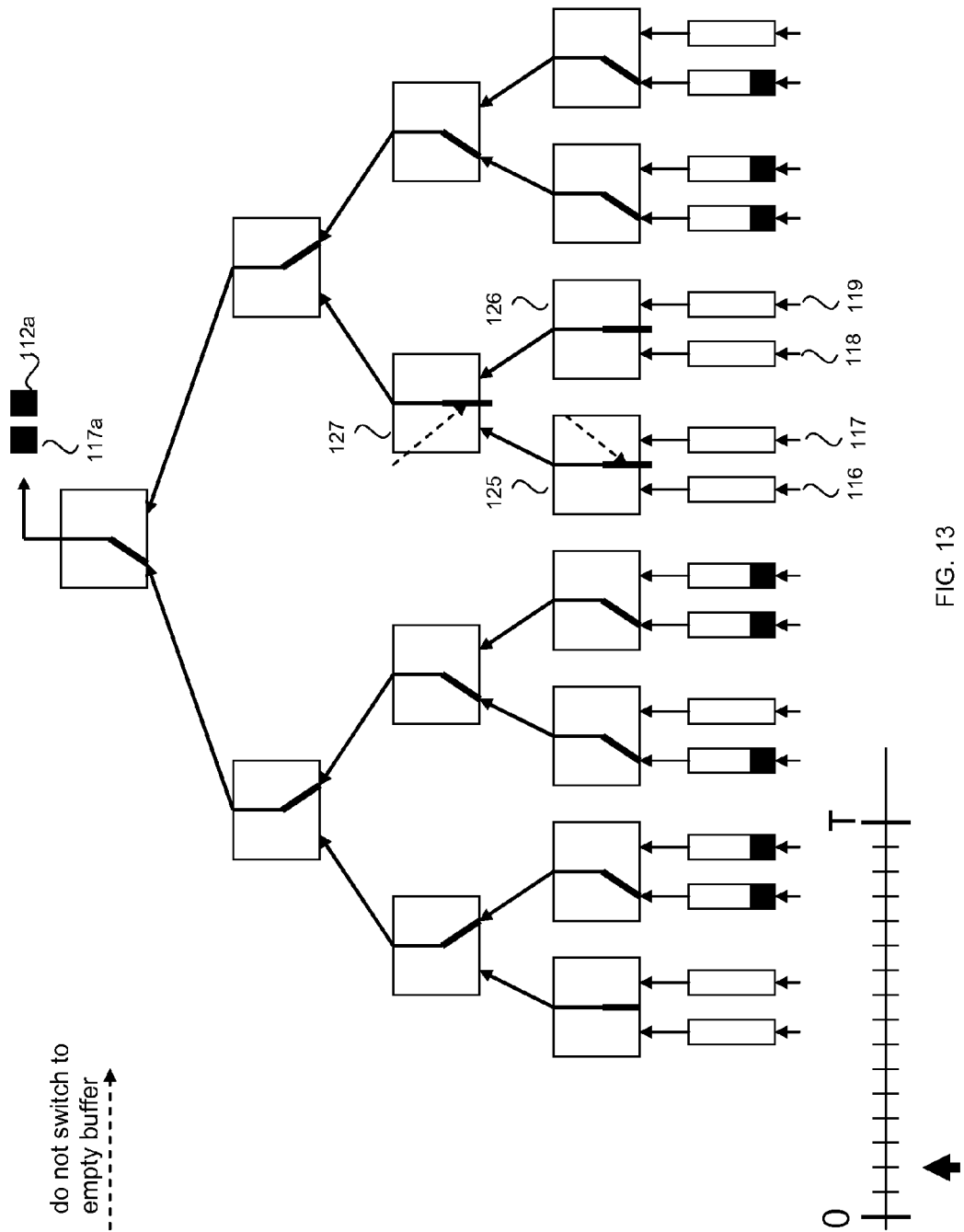
Figure 14:
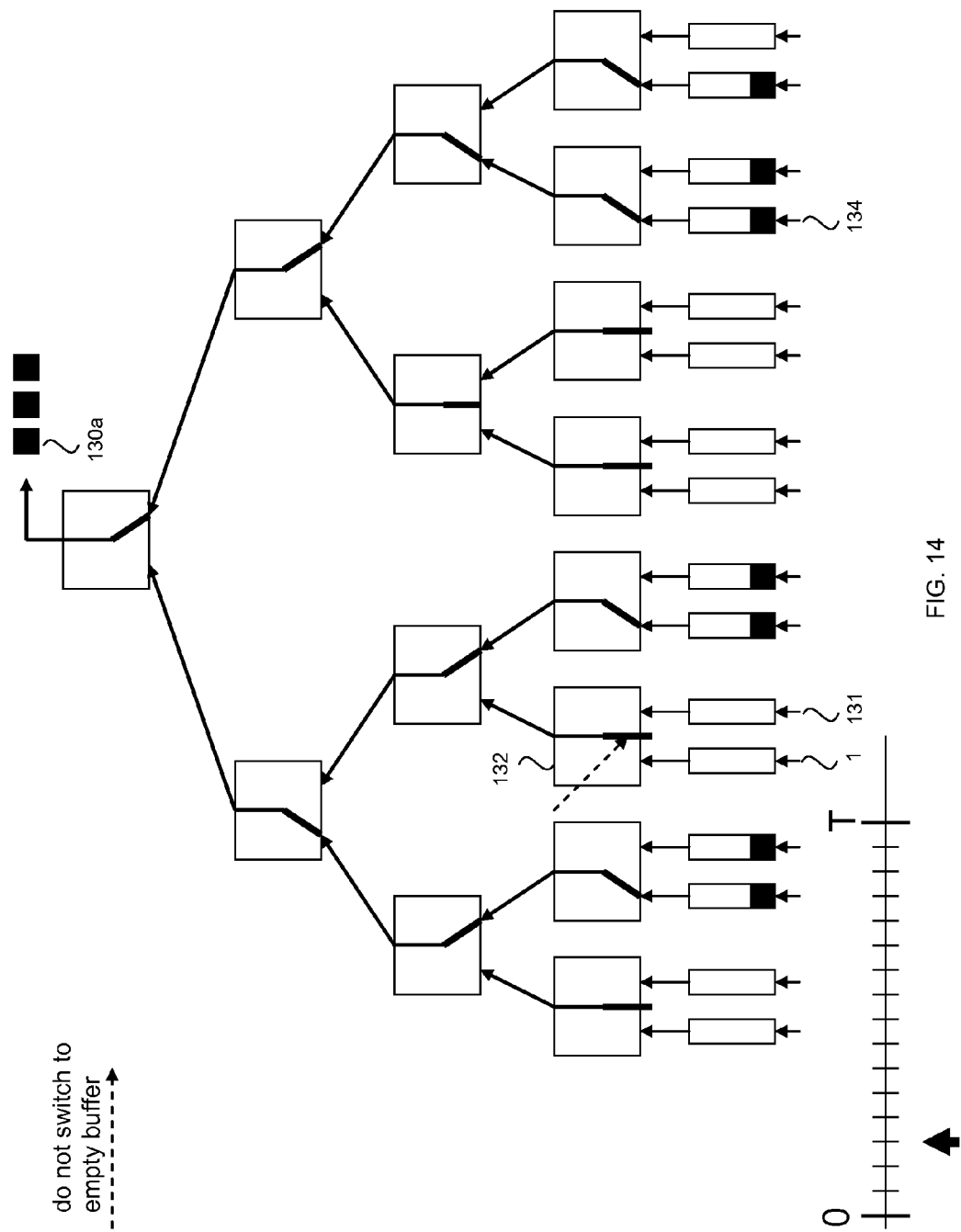
Figure 15:
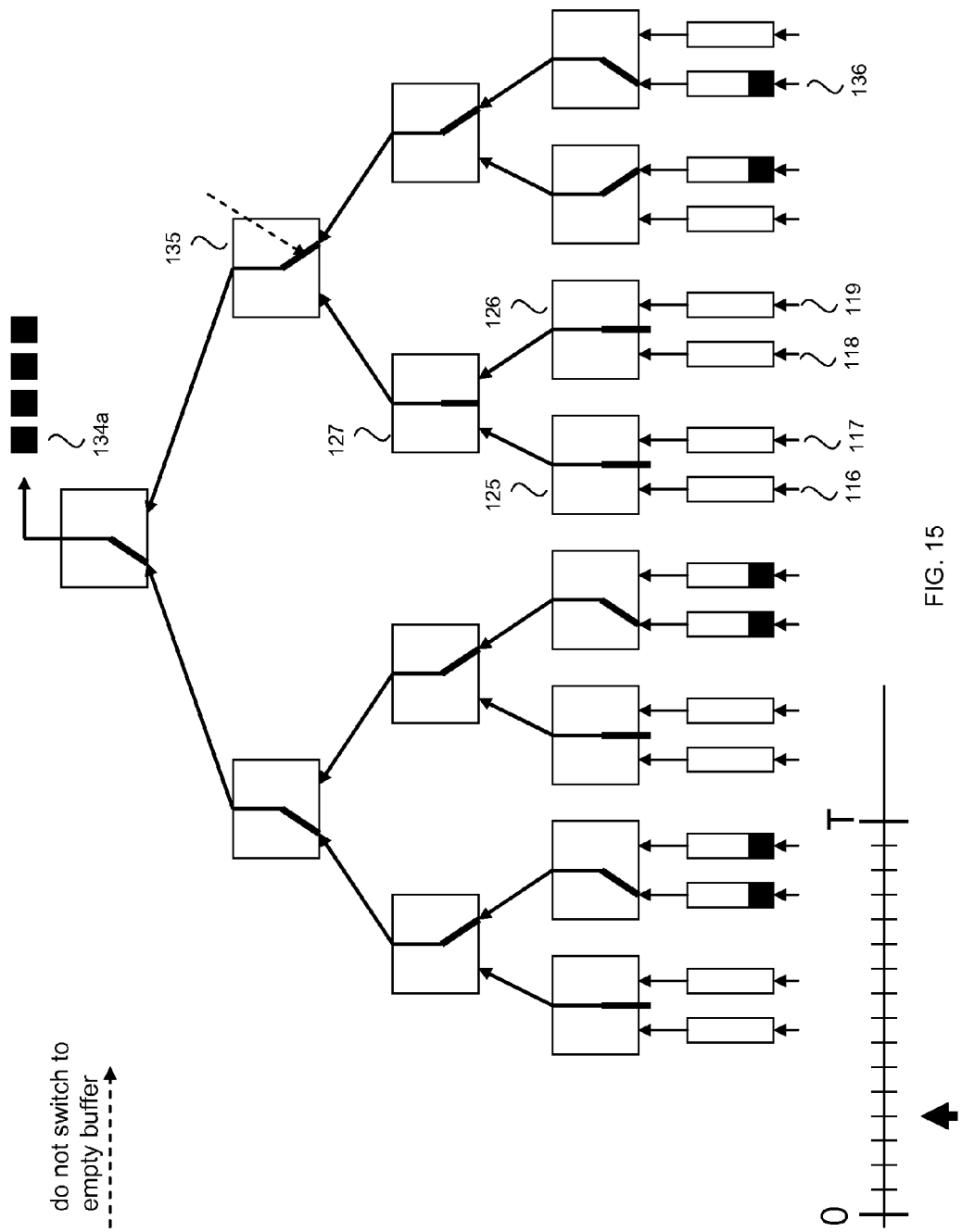
Figure 16:
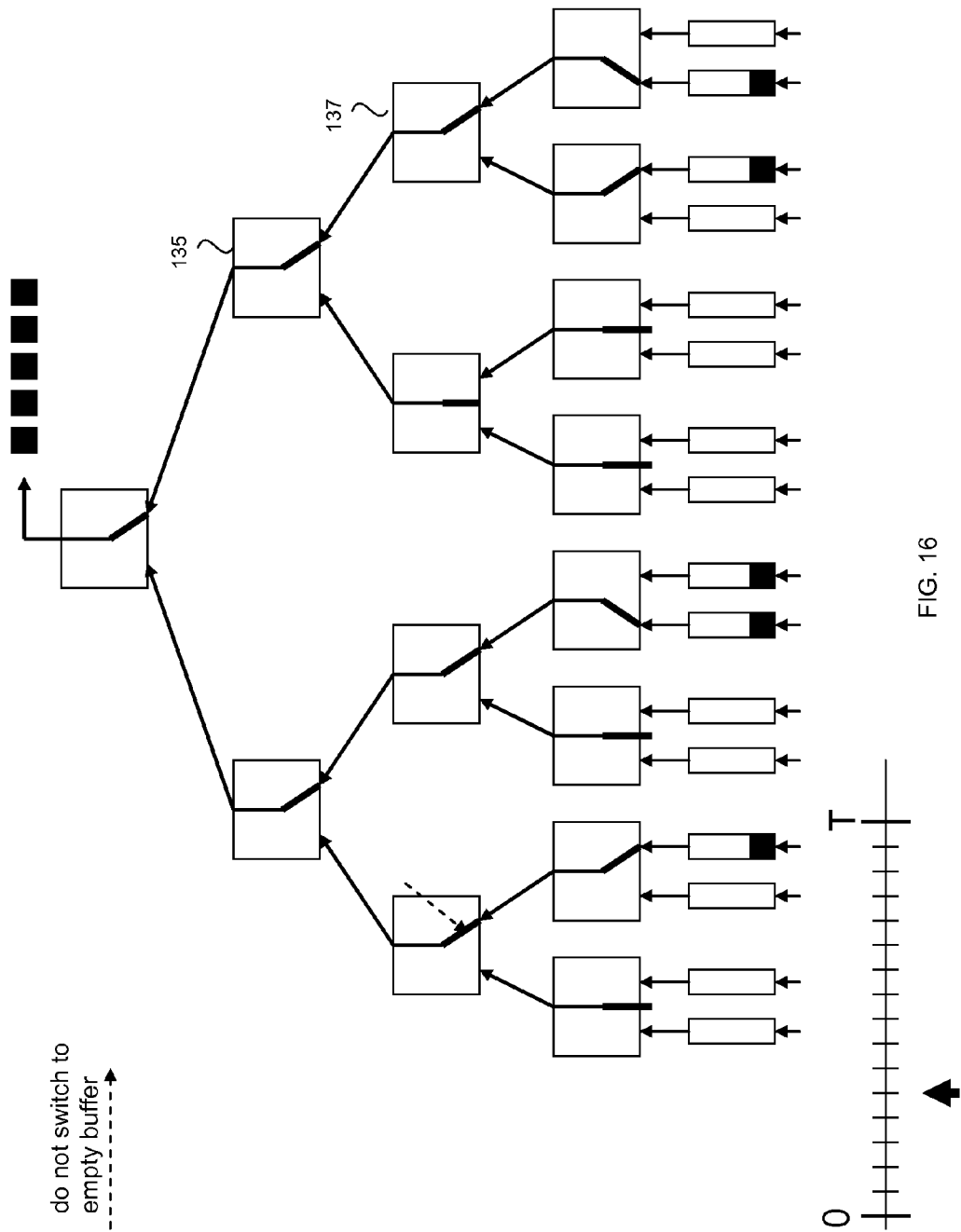

At a next iteration, shown by FIG. 13 buffer 117 has been passed to the output (indicated by reference numeral 117a) triggering a configuration along the routing path. Since each of buffers 116, 117, 118 and 119 are now empty, the empty_in signals to mx_a 127 are both empty, so neither data input to mx_a 127 is selected. In the state shown by FIG. 14, buffer 130 has been passed to the output (indicated by 130*a*), but because buffer 131 is empty, the mx_a 132 selects to pass neither data input. Buffer 134 is now the routed buffer. In the state shown by FIG. 15, buffer 134 has been passed to the output (indicated by 134*a*) causing configuration along the data transmission path. However, because buffers 116, 117, 118, 119 remain empty, one of the empty_in inputs to mx_a 135 is empty, while the other empty_in input is not empty, by virtue of data in buffer 136. Thus, the control logic of the RS flip-flop in mx_a 135 prevents the mx_a from reconfiguring to an empty buffer. FIG. 16 shows the final state in which mx_a 135 remains connected to mx_a 137.

With reference again to FIG. 8, signal 'select', in the form of mx_a outputs sel_0_out and sel_1_out is propagated from the last multiplexer stage back to the multiplexers and payload buffers in the first stage. Along the way it is gated by the outputs of each flip-flop 82, such that at most one data buffer is selected for transmission.

Signals d_0_in, d_1_in and d_out of FIG. 8 are shown as single wires (i.e. 1-bit data buses), but it should be clear that any other data bus width is equally beneficial in terms of the multiplexer functionality and can be used for implementation of mux_aug and the N-to-1 switch. In fact, the choice of a multiple bit or multiple byte data bus is contemplated as it would increase the throughput of the N-to-1 switch.

It should be noted that the described N-to-1 multiplexer works without a clock signal, however the payload buffers are driven by a clock and their output data rate is dictated by this clock. Consequently, the same clock could be received by the receiver connected to the end of the N-to-1 multiplexer. Further, there are many known strategies for buffer overflow prevention. For example, this can be done by sending "Pause" packets to the sender, as specified in the IEEE 802.3 standard, thus making it unnecessary to specify a specific ratio between the bit rate of payload arriving at the buffers and the bit rate at which the buffers are emptied through the N-to-1 multiplexer of this invention.

The augmented demultiplexers and multiplexers depicted by FIGS. 5 to 16 are shown for the purposes of illustrating the logic function only. It will be apparent to a person skilled in the art, that these logic functions can be implemented by many alternative circuits to the ones depicted in these figures and all such variations are intended to be encompassed herein.

The augmented demultiplexers and augmented multiplexers depicted and described herein may be incorporated into network routing and switching devices that may subsequently incorporated into a network. For example, network routing device can include at least one 1:N augmented demultiplexer for transmitting data and at least one N:1 augmented multiplexer for receiving data.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories depicted in any one of FIGS. 5-16. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via at least one of a plurality of protocols.

What is claimed is:

1. A method for configuring a routing device comprising a plurality of switching elements and a demultiplexer that can be configured to form a routing path through the routing device, the method comprising:

receiving a control signal into the routing device;

propagating the control signal into the routing path, wherein the routing device comprises at least 2N−1 switching elements, wherein N comprises one of a number of input channels and a number of output channels, wherein propagating the control signal comprises propagating the control signal to a number of the switching elements that is proportional to $\log_2(N)-1$;

configuring the switching elements on the routing path that receive the control signal;

receiving a configuration phase signal that places the demultiplexer in a configuration phase;

during the configuration phase, selecting one of a first routing path and a second routing path;

configuring the selected one of the first routing path and the second routing path as an output routing path; and outputting the configuration phase signal on the output routing path.

2. The method according to claim 1 comprising propagating the control signal on a next data transmission path.

3. The method according to claim 1 comprising propagating the control signal on a current data transmission path.

4. The method according to claim 1 wherein a CMOS routing device comprises a 1:N demultiplexer that comprises a cascaded plurality of 1:2 demultiplexers, and wherein the method comprises:

receiving the control signal into a first 1:2 demultiplexer on the routing path, the control signal placing the demultiplexer into a configuration phase;

receiving a selection signal into the first 1:2 demultiplexer during the configuration phase;

selecting one of a first downstream 1:2 demultiplexer and a second downstream 1:2 multiplexer;

configuring the first 1:2 demultiplexer to provide data transmission to the selected one of the first downstream 1:2 demultiplexer and the second downstream 1:2 multiplexer; and propagating the control signal from the first 1:2 demultiplexer to only the selected one of the first downstream 1:2 demultiplexer and the second downstream 1:2 multiplexer.

5. The method according to claim 1 wherein a CMOS routing device comprises an N:1 multiplexer that comprises a cascaded plurality of 2:1 multiplexers, and wherein the method comprises:

receiving the control signal into a first 2:1 multiplexer on the routing path; and switching the configuration of the first 2:1 multiplexer in response to the control signal.

6. A 1:N demultiplexer comprising:
a plurality of 1:2 demultiplexers comprising:
control circuitry configured to:
receive a configuration phase signal that places the 1:2 demultiplexer in a configuration phase;
during the configuration phase, select one of a first routing path and a second routing path;
configure the selected one of the first routing path and the second routing path as an output routing path;
output the configuration phase signal only on the output routing path, and wherein the control circuitry comprises a switch configuration register that is configured to:
receive a selection signal;
output a switch configuration control signal that configures the output routing path; and
a pass register configured to receive the configuration phase signal and to provide a pass register output that gates the switch configuration control signal output of the switch configuration register; and
a data demultiplexer configured to, during a data transmission phase:
receive an input data signal; and
output the input data signal onto the output routing path configured during the configuration phase.

7. The 1:N demultiplexer according to claim 6 wherein the pass register output is combined with a clock signal, the combined signal being provided as a trigger input to the switch configuration register such that the switch configuration register is triggered by a first edge of the clock signal during the configuration phase.

8. The 1:N demultiplexer according to claim 7 comprising a configuration phase signal demultiplexer configured to propagate the configuration phase signal on the output routing path, an input signal of the configuration phase signal demultiplexer comprising the output of the pass register.

9. The 1:N demultiplexer according to claim 8 wherein the pass register is configured to be triggered by an edge of the clock signal that is opposite the first edge of the clock signal such that the pass register output updates at least one half cycle after the switch configuration control signal updates.

10. The 1:N demultiplexer according to claim 6 wherein the control circuitry is configured to receive a reset signal that resets the pass register at the conclusion of the switch configuration phase.

11. The 1:N demultiplexer according to claim 6 wherein the control circuitry comprises one or more control signal demultiplexers configured to propagate one or more control signals on the output routing path, each of the one or more control signal demultiplexers being configured by the switch configuration control signal.

12. The 1:N demultiplexer according to claim 11 wherein the one or more control signal demultiplexers comprise at least one of: a configuration phase signal demultiplexer configured to propagate the configuration phase signal; a switch configuration demultiplexer configured to propagate the selection signal; a clock signal demultiplexer configured to propagate a clock signal; and a register reset demultiplexer configured to propagate a register reset signal.

13. A routing device, comprising:
a plurality of 2:1 multiplexers comprising:
a first input path;
a second input path;
an output path;
a data multiplexer configured to:
receive an input data signal on a selected one of the first input path or the second input path;
output the input data signal on the output path; and
control circuitry configured to:
receive at least one control signal;
propagate the at least one control signal on the output path; and
switch the configuration of the data multiplexer in response to the at least one control signal; and
a demultiplexer comprising:
a receiver configured to receive a configuration phase signal that places the demultiplexer in a configuration phase;
control circuitry configured to:
during the configuration phase, select one of a first routing path and a second routing path;
configure the selected one of the first routing path and the second routing path as an output routing path;
output the configuration phase signal on the output routing path;
determine if data is available on a non-selected one of the first input path and the second input path; and
if data is available on a non-selected one of the first input path and the second input path, configure the data multiplexer to select the non-selected one of the first input path and the second input path.

14. The N:1 multiplexer according to claim 13 wherein the at least one control signal indicates completion of a data transmission on a configured routing path of the N:1 multiplexer, the configured routing path comprising a selected plurality of the 2:1 multiplexers, and wherein the at least one control signal causes only the selected plurality of 2:1 multiplexers to switch configuration.

15. The N:1 multiplexer according to claim 14 wherein if data is not available on the non-selected one of the first input path and the second input path, the control circuitry is configured to select neither of the first input path nor the second input path to connect to the output path.

16. The N:1 multiplexer according to claim 15 wherein the control circuitry comprises an RS flip-flop configured to:
receive an indication of data availability on the first data path as a first input;
receive an indication of data availability of the second data path as a second input; and
output to the data multiplexer a selection of the first data path, the second data or neither of the first or second data paths.

17. A network routing or switching device comprising at least one node transmitting data via at least one 1:N demultiplexer and receiving data via at least one N:1 multiplexer, wherein the at least one 1:N demultiplexer comprises:
a plurality of 1:2 demultiplexers comprising:
control circuitry configured to:
receive a configuration phase signal that places the 1:2 demultiplexer in a configuration phase;
during the configuration phase, select one of a first routing path and a second routing path;
configure the selected one of the first routing path and the second routing path as an output routing path; and
output the configuration phase signal only on the output routing path; and wherein the control circuitry comprises a switch configuration register that is configured to:
receive a selection signal;
output a switch configuration control signal that configures the output routing path;

a pass register configured to receive the configuration phase signal and to provide a pass register output that gates the switch configuration control signal output of the switch configuration register; and a data demultiplexer configured to, during a data transmission phase:
receive an input data signal; and
output the input data signal onto the output routing path configured during the configuration phase;

and wherein the at least N:1 multiplexer comprises:
a plurality of 2:1 multiplexers comprising:
a first input path;
a second input path;
an output path;
a data multiplexer configured to:
receive an input data signal on a selected one of the first input path or the second input path; and
output the input data signal on the output path; and
control circuitry configured to:
receive at least one control signal;
propagate the at least one control signal on the output path; and
switch the configuration of the data multiplexer in response to the at least one control signal.

18. A network comprising a plurality of network routing or switching devices comprising at least one node transmitting data via at least one 1:N demultiplexer and receiving data via at least one N:1 multiplexer, wherein the at least one 1:N demultiplexer comprises:
a plurality of 1:2 demultiplexers comprising:
control circuitry configured to:
receive a configuration phase signal that places the 1:2 demultiplexer in a configuration phase;
during the configuration phase, select one of a first routing path and a second routing path;
configure the selected one of the first routing path and the second routing path as an output routing path; and
output the configuration phase signal only on the output routing path; and a data demultiplexer configured to, during a data transmission phase:
receive an input data signal; and
output the input data signal onto the output routing path configured during the configuration phase;

and wherein the at least N:1 multiplexer comprises:
a plurality of 2:1 multiplexers comprising:
a first input path;
a second input path;
an output path;
a data multiplexer configured to:
receive an input data signal on a selected one of the first input path or the second input path; and
output the input data signal on the output path; and
control circuitry configured to:
receive at least one control signal;
propagate the at least one control signal on the output path; and
switch the configuration of the data multiplexer in response to the at least one control signal;
determine if data is available on a non-selected one of the first input path and the second input path; and
if data is available on a non-selected one of the first input path and the second input path, configure the data multiplexer to select the non-selected one of the first input path and the second input path.

\* \* \* \* \*